(12) United States Patent
Guo et al.

(10) Patent No.: US 12,459,381 B2
(45) Date of Patent: Nov. 4, 2025

(54) CHARGING APPARATUS, DISCHARGING APPARATUS, AND VEHICLE

(71) Applicant: HONDA MOTOR CO., LTD., Tokyo (JP)

(72) Inventors: Chuyun Guo, Guangzhou (CN); Bolan Li, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 432 days.

(21) Appl. No.: 17/973,564

(22) Filed: Oct. 26, 2022

(65) Prior Publication Data
US 2023/0145978 A1 May 11, 2023

(30) Foreign Application Priority Data

Nov. 5, 2021 (CN) .......................... 202111306329.7

(51) Int. Cl.
*B60L 53/16* (2019.01)
*B60L 53/18* (2019.01)
(Continued)

(52) U.S. Cl.
CPC ............... *B60L 53/16* (2019.02); *B60L 53/18* (2019.02); *H01R 13/5025* (2013.01);
(Continued)

(58) Field of Classification Search
CPC ..... B60L 53/16; B60L 53/18; H01R 13/5025; H01R 13/629; H01R 13/639; H01R 2201/26
See application file for complete search history.

(56) References Cited

U.S. PATENT DOCUMENTS 6,827,594 B1 * 12/2004 Davis ............... H01R 13/62933
                                                           439/157
7,086,389 B2 * 8/2006 Yamada ................... F02M 9/14
                                                           123/519
(Continued)

FOREIGN PATENT DOCUMENTS

CN          207538615 U       6/2018
CN          213768277         7/2021
(Continued)

OTHER PUBLICATIONS

German Office Action for German Patent Application No. 102022128934.6 mailed Feb. 11, 2025.
(Continued)

*Primary Examiner* — Thanh Tam T Le
(74) *Attorney, Agent, or Firm* — Amin, Turocy & Watson, LLP (57) ABSTRACT

A charging/discharging apparatus includes a base, a fixing base, and a cover plate, wherein the fixing base includes an end plate, a connection member, an opening, and an accommodation space. The cover plate is formed in an arch-shaped structure or a bending surface structure and includes an accommodation state in which the end plate is exposed and a covering state in which the end plate is covered. When the cover plate is in the accommodation state, an end of the cover state which is close to the base is provided to be directed to the accommodation space.

15 Claims, 6 Drawing Sheets

(51) Int. Cl.
  *H01R 13/502* (2006.01)
  *H01R 13/629* (2006.01)
  *H01R 13/639* (2006.01)

(52) U.S. Cl.
  CPC ......... *H01R 13/629* (2013.01); *H01R 13/639* (2013.01); *H01R 2201/26* (2013.01)

(56) References Cited

U.S. PATENT DOCUMENTS

| | | | |
|---|---|---|---|
| 8,535,071 B1* | 9/2013 | Mueller | H01R 13/6315 439/923 |
| 8,888,515 B2* | 11/2014 | Hachadorian | H01R 13/447 439/142 |
| 9,184,532 B2* | 11/2015 | Crovetti | H01R 13/62955 |
| 9,543,719 B2* | 1/2017 | Bartholomew | H01R 24/76 |
| 9,656,694 B2* | 5/2017 | Terashima | B62D 21/152 |
| 9,666,988 B2* | 5/2017 | Gates | F16K 35/10 |
| 9,917,389 B2* | 3/2018 | Markefka | H01R 13/05 |
| 10,800,277 B2* | 10/2020 | Hatami | B62D 25/12 |
| 10,850,631 B2* | 12/2020 | Myer | H02J 7/0045 |
| 10,946,755 B2* | 3/2021 | Schwan | H01R 13/6397 |
| 11,370,371 B2* | 6/2022 | Takizawa | B60K 1/04 |
| 11,469,531 B2* | 10/2022 | Cole | B60L 53/11 |
| 11,749,934 B2* | 9/2023 | Feldner | H01R 13/506 439/76.2 |
| 11,827,113 B2* | 11/2023 | Underhill | B60L 3/04 |
| 11,858,409 B2* | 1/2024 | Spincich | B60Q 1/0017 |
| 11,904,715 B2* | 2/2024 | Erikson | B60L 53/16 |
| 2020/0101853 A1 | 4/2020 | Nakanishi et al. | |
| 2023/0145978 A1 | 5/2023 | Guo et al. | |

FOREIGN PATENT DOCUMENTS

| | | |
|---|---|---|
| CN | 116080770 | 5/2023 |
| DE | 102019214186 | 4/2020 |
| JP | 3795225 | 7/2006 |
| JP | 2020-050126 | 4/2020 |

OTHER PUBLICATIONS

Japanese Office Action for Japanese Patent Application No. 2022-173297 dated Sep. 24, 2025.

* cited by examiner

CHARGING APPARATUS, DISCHARGING APPARATUS, AND VEHICLE

CROSS-REFERENCE TO RELATED APPLICATION

Priority is claimed on Chinese Patent Application No. 202111306329.7, filed Nov. 5, 2021, the content of which is incorporated herein by reference.

TECHNICAL FIELD

The present disclosure relates to a technical field of vehicle charging and discharging for a vehicle, and more particularly to a charging apparatus, a discharging apparatus, and a vehicle.

BACKGROUND ART

With the improvement of people's living standards, automobiles have become a daily means of transportation for most households. At the same time, problems such as energy destruction and pollution have arisen, especially the air pollution and resource shortages have become major issues. In order to reduce the problems of the air pollution and the resource shortage due to the automobiles, new energy vehicles mainly using the electric energy gradually become the focus of development.

For example, taking the electric vehicle as an example, it is necessary to charge the electric vehicle in order to ensure sufficient electrical energy during the use of the electric vehicle. Generally, a charging structure is installed in the electric vehicle, and a charging cover plate is installed outside the charging structure to shield and seal it. During the process of charging, it is possible to perform the charging operation by turning over the charging cover plate and inserting a charging plug into a charging terminal of the charging structure. Since the charging cover plate is generally designed to have a flat plate structure, in the process of turning over the charging cover plate, the area crossed by the flat charging cover plate (especially in the vertical direction) becomes larger such that the necessary space around the charging structure is increased.

SUMMARY OF INVENTION

Technical Problem

Currently, many companies have researched and developed the structure of charging apparatus and discharging apparatus in order to improve comfort and overall appearance when performing the charging of the vehicles. Among such research, in Chinese Utility Model (Registered) Publication No. 207538615, a push-type secondary opening mechanism in the cover plate of the charging port of a fully electric vehicle is described. The secondary opening mechanism has a charging-port-cover-plate attachment mechanism and a secondary opening mechanism. The charging-port-cover-plate attachment mechanism is located in a hollow cavity of the front bumper body and has a charging-port-cover-plate upper cover plate, a charging-port-cover-plat base and a four-bar linkage mechanism. The charging-port-cover-plate upper cover plate is movably coupled to the charging-port-cover-plat base via the four-bar linkage. The secondary opening mechanism has a first locking mechanism and a second locking mechanism. The first locking longitudinal slider and the first locking latch are located inside the charging-port-cover-plate upper cover plate, and an opening handle is located on the outer wall of the charging-port-cover-plate upper cover plate. The second locking latch and the second-locking-latch position limiting block are compounded for the position limiting. As disclosed in Chinese Utility Model (Registered) Publication No. 207538615, since the charging fixing bracket does not have a space for accommodating the cover plate, when the cover plate is turned over, the cover plate rotates to the front side of the vehicle, that is, the cover plate is retained outside. Therefore, the cover plate is easily damaged by being collided with an external structure, and if the cover plate is left on the front side of the vehicle body, the regularity and aesthetic appearance of the vehicle as a whole will be affected.

In Japanese Patent (Granted) Publication No. 3795225, another mounting method for a charging port cover is disclosed. A radiator grille of an electric vehicle is formed with a charging port into which an external charging plug can be inserted, and the charging port is attached with an openable and closable cover. The cover body is mainly composed of a cover portion, and a trapezoidal structure of the cover portion has a shape similar to a rectangular shape of the charging port. Also, on both sides of the cover portion, a cover support portion extend downwardly and form an angle of approximately 90 degrees with respect to the cover. Cover support brackets that are substantially parallel to the cover support portions are attached to the rear side of the radiator grille so as to be positioned outside the respective cover support portions. A rotation central axis of each cover support portions extends outwardly in the left-right direction from an intermediate portion in the front-rear direction, and each cover support portion is rotatably supported by the corresponding cover support bracket via the rotation central axis. By rotating the cover body rearward about the rotation central axis, most of the cover rotates from a state of being hidden in the radiator grille to protrude outward. The shape of the cover in the longitudinal section is linear, that is, the cover is designed in a flat plate shape and the cover traverses a large area during the rotation process such that the charging port is adjusted to be wide open. According to this configuration, since the cover described in Japanese Patent (Granted) Publication No. 3795225 has a large rotation angle and uses a large space, it is necessary to secure a relatively large space at the front of the vehicle for the cover to rotate. However, such a rotation design for the cover is not suitable for a vehicle type with a compact front body structure and a relatively small space.

Solution to Problem

A first aspect of the present disclosure is a charging apparatus or discharging apparatus including a base; a fixing base that is fixed and provided on the base; and a cover plate, wherein the fixing base includes an end plate; a connection member that is formed by extending from the end plate to the base and connected with the base; an opening that is provided on the end plate and configured to perform charging and discharging; and an accommodation space that is formed by the connection member being recessed or formed by being surrounded by the connection member and the base, the cover plate is formed in an arch-shaped structure or a bending surface structure and includes an accommodation state in which the end plate is exposed and a covering state in which the end plate is covered, and when the cover plate is in the accommodation state, an end of the cover state which is close to the base is provided to be directed to the accommodation space.

According to the above-described aspect, the charging apparatus or discharging apparatus according to the present aspect is configured to use the base to arrange the fixing base and provide the openings on the end plate of the fixing base to realize the charging and discharging operations. In the end plate, the connection member formed to extend toward the base in the end plate is configured to form the accommodation space by being recessed, or the accommodation space is formed by being surrounded by the connection member and the base. At the time of performing the charging operation or the discharging operation, the cover plate is turned over so as to be positioned in the accommodation space or in the upper portion of the accommodation space. The cover plate is formed in the arch-shaped structure or the bending surface structure such that when the cover plate is turned over, compared with the flat-shaped cover, the rotation angle becomes smaller and the occupied space during the rotation relatively becomes smaller. At the same time, when the cover plate is in the accommodation state, the cover plate formed in the arch-shaped structure or the bending surface structure does not protrude to the outside and the regularity for accommodating the cover plate is effectively improved such that it is possible to improve the aesthetics degree at the time of performing the charging and the discharging. The accommodation space is formed by the connection member being recessed or being surrounded by the connection member and the base such that it is possible to achieve the evacuation effect, effectively improve the space utilization ratio, and further save space. Such structure is suitable for the vehicle type in which the structure in the front side of the vehicle body is compact and the space is relatively small.

In an example, when the cover plate is in the accommodation state, the end of the cover state which is close to the base is positioned in the accommodation space.

According to the configuration, the cover plate can enter the accommodation space such that the space utilization ratio becomes higher.

In an example, the connection member includes a first surface having an arch surface, and the arch shape of the first surface matches with a shape of the cover plate.

According to the configuration, the first surface is formed as the arch-shaped surface, and the shape of the first surface matches with the shape of the cover plate. Accordingly, when the cover plate is in the accommodation space, a gap between the cover plate and the first surface becomes smaller and the space utilization ratio becomes higher.

In an example, a number of the openings is at least two.

According to the configuration, by providing at least two openings, it is possible to improve the comfort level of the user. The user can choose which opening to fit their needs and insert the charging plug or the discharging apparatus.

In an example, a number of the fixing base is equal to the number of the openings, and an evacuation space is formed between the adjacent fixing bases.

According to the configuration, it is possible to improve the installation convenience by providing the evacuation space between each adjacent fixing bases and providing a space for mounting other members.

In an example, the charging apparatus or discharging apparatus further includes at least two charging terminals provided in the corresponding openings; and at least two charging cable bundles which has one end passing through the evacuation space to electrically connect with the corresponding charging terminal and another end connecting with a power source, or the charging apparatus or discharging apparatus further includes at least two discharging terminals provided in the corresponding openings; and at least two discharging cable bundles which has one end passing through the evacuation space to electrically connect with the corresponding discharging terminal and another end connecting with the power source.

According to the configuration, each charging terminal is disposed in the corresponding opening. One end of each charging cable bundle is connected to the power source and the other end of each charging cable bundle passes through the evacuation space and electrically connected to the corresponding charging terminal. Alternatively, each discharging terminal is disposed in the corresponding opening. One end of each discharging cable bundle is connected to the power source and the other end of each discharging cable bundle passes through the evacuation space and electrically connected to the corresponding discharging terminal. The charging cable bundle or the discharging cable bundle can be arranged by passing through the evacuation space so as to effectively improve the regularity of wiring between the two charging terminals or discharging terminals and make the installation to be convenient.

In an example, the end plate is provided at an end separating from the base in the fixing base.

According to the configuration, the end plate is arranged at the end separating from the base in the fixing base, that is, the end plate is arranged to be away from the base. The end plate is arranged to be outside such that it is convenient for the user to insert the charging plug or the discharging apparatus into the opening and the convenience of the operations is effectively improved.

In an example, the end plate includes an end surface for charging or discharging, and the end surface is inclined to the base side from a lower side toward an upper side.

According to the configuration, the end surface is arranged to be inclined to the base side from the lower side toward the upper side. That is, the opening is arranged in a direction in which an elevation angle is inclined upward such that the user can more easily carry out the charging or discharging operation in accordance with the opening on the end face and improve the convenience of operation. At the same time, the end surface is arranged to be inclined upward, at the time of charging or discharging, the insertion direction of the charging plug or discharging apparatus faces the end face, and the end face and the fixing base can effectively disperse the force and weight due to the insertion of the charging plug or discharging apparatus such that the load-bearing capacity and the structural strength can be improved.

In an example, the base includes a mounting surface for mounting the end plate, and the mounting surface is formed as a bending surface.

According to the configuration, the mounting surface of the base is formed as the bending surface. Due to such a bending surface, the effect of the force due to the end plate is dispersed to improve the structural strength and supporting weight of the base.

In an example, the mounting surface includes an upper portion formed to extend toward the upper side; a middle portion provided to be inclined and including an upper end connected to a bottom side of the upper portion; and a lower portion formed to extend toward the lower side and including an upper end connected to a bottom side of the middle portion.

According to the configuration, the mounting surface uses the upper portion, the middle portion, and the lower portion to disperse the effect of the force due to the end plate so as to improve the structural strength and supporting weight of the base.

In an example, the connection member is provided in a top portion of the end plate, and the first surface is formed toward the top portion.

According to the configuration, the connection member is arranged on the top portion of the end plate, and when the cover plate is turned over, the cover plate is accommodated by being turned over toward the top portion of the end plate.

In an example, the fixing base further includes a first reinforcing member that is connected with the base and a side portion of the end plate.

According to the configuration, the first reinforcing member is connected to the side portion of the end plate to reinforce the connection at the side portion side of the end plate so as to effectively improve the structural strength of the end plate.

In an example, the fixing base further includes a second reinforcing member that is connected with the base and a bottom portion of the end plate.

According to the configuration, the second reinforcing member is connected to the bottom portion of the end plate to reinforce the connection at the bottom portion side of the end plate so as to effectively improve the structural strength of the end plate.

In an example, the first reinforcing member and the second reinforcing member have a plate-shaped structure.

According to the configuration, the connection member, the first reinforcing member, and the second reinforcing member are all formed in a plate-shaped structure, and compared with the structure such as a link or the like, the reinforcing member formed in the plate-shape structure can further improve the connection strength.

In an example, the connection member includes a first bending portion for connecting the base, the first bending portion being toward a surface on one side of the base and attaching to the surface of the base, and/or the first reinforcing member includes a second bending portion for connecting the base, the second bending portion being toward a surface on one side of the base and attaching to the surface of the base, and/or the second reinforcing member includes a third bending portion for connecting the base, the third bending portion being toward a surface on one side of the base and attaching to the surface of the base.

According to the configuration of providing the bending portion, at the time of connecting the connection member, the first reinforcing member, and the second reinforcing member to the base, it is possible to attach the bending portion to the surface of the base so as to effectively improve the connection strength of the connection member, the first reinforcing member, and the second reinforcing member.

In an example, the charging apparatus or discharging apparatus further includes a locking device connected with the cover plate and configured to lock and rotate the cover plate.

According to the configuration, it is easy to perform the charging operation by using the locking device to lock the cover plate.

According to a second aspect of the present disclosure, a vehicle includes a vehicle body; and the charging apparatus or discharging apparatus, wherein the base of the charging apparatus or discharging apparatus is provided in the vehicle body.

According to the vehicle disclosed in the above-described aspect, due to the above-described charging apparatus or discharging apparatus, it is possible to realize the charging operation or the discharging operation. If the vehicle is a fuel cell vehicle, the charging apparatus or discharging apparatus has the discharging function. The charging apparatus or discharging apparatus described above can effectively improve the overall regularity and aesthetics during charging of the vehicle by accommodating the cover plate during charging or discharging. Also, since less space is required to accommodate the cover plate, the configuration is suitable for the vehicle type whose structure in the front portion of the vehicle body thereof is compact and having relatively small space therein.

In an example, the vehicle body includes a front cross member and a front bumper, and in the base, an upper portion at a side being away from the fixing base is connected with a front side of the front cross member, and a lower portion at the side being away from the fixing base is connected with a front side of the front bumper.

According to the configuration, it is possible to secure the connection strengthen of the base by connecting the base to each of the front cross member and the front bumper.

DESCRIPTION OF EMBODIMENTS

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations described in the figures are only specific examples of the present application and a person with ordinary skill in the art can achieve other figures based on the enclosed figures of the present application.

In the following description, it is noted that the terms "upper", "lower", "front", and "rear" should be understood with reference to the vehicle. For example, the term "upper" refers to the direction toward the roof portion of the vehicle, the term "lower" refers to the direction toward the bottom portion of the vehicle, the term "front" refers to the direction toward the vehicle head, and the term "rear" refers to the direction toward the vehicle tail. Such terms are only used to easily describe the directions and positional relationships based on the enclosed figures. Such terms are not used to indicate or implicit the apparatus and the element thereof have the particular directions and positions, to be configured and operated in the particular directions and at the specific positions, such that the present disclosure is not limited by these terms. For a person with ordinary skill in the art, the specific meaning of the above-mentioned terms may be suitably understood according to the actual situation.

The terms "first", "second", and "third" are only used for making the description easy to understand, and they are not used to indicate or implicit the importance of the configurations or implicit the amount of the technical features. Unless otherwise defined, the term "a plurality of" means that an amount equal to two or more than two.

In the following description, unless otherwise defined, the terms "attach", "communicate", "connect" or the like should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

During the usage of an electric vehicle, it is necessary to charge the electric vehicle in order to ensure power sufficiency. An electric vehicle is generally provided with a charging structure, and may be provided with a charging cover plate for shielding or sealing an opening outside the charging structure. During charging, the charging operation can be performed by turning over the charging cover plate and inserting the charging plug into the charging terminal of the charging structure. The method of turning over the charging cover plate can be roughly divided into two methods. One method is to remove the charging cover plate and place it outside the vehicle body, but this affects the overall regularity and aesthetics, and the external charging cover plate can easily be collided with an external object. Another method is to insert the charging cover plate into the vehicle body while turning over the charging cover plate. However, according to this method, since the rotation angle when turning over the charging cover plate is relatively large, it is necessary to secure a large space for turning over the charging cover plate in the front portion of the vehicle. In addition, since the charging cover plate is inserted into the vehicle body, it is necessary to secure a large space for inserting the charging cover plate also inside the vehicle body. Therefore, such a structure is not suitable for a vehicle having a compact structure in the front portion of the vehicle body and having a relatively small space.

An embodiment of the present disclosure provides a charging apparatus or discharging apparatus and a vehicle. A cover plate of the charging apparatus or discharging apparatus adopts the cover plate with an arch-shaped structure or a bending surface structure, and the space required for rotation is relatively small compared to the cover with a flat plate structure. An accommodation space having an evacuation function is formed in the charging apparatus or discharging apparatus. By rotating the cover plate and accommodating the cover plate in the evacuation space, the overall appearance during the charging becomes tidier, and the aesthetics thereof is improved. In addition, since the space utilization ratio is high, the configuration is suitable for the vehicle whose structure in the front portion of the vehicle body is compact and having relatively small space.

Referring to FIG. 1 to FIG. 5, according to a first embodiment of the present disclosure, a charging apparatus or discharging apparatus 100 including a base 10, a fixing base 20 and a cover plate 30 is provided. The fixing base 20 is mounted on the base 10. The fixing base 20 has an end plate 21 and a connecting member 22 formed to extend from the end plate 21 toward the base 10 and connected to the base 10. An opening 211 for charging or discharging is provided on the end plate 21. A user performs the charging operation by inserting a charging plug into the opening 211 toward the end plate 21. Alternatively, the user performs the discharging function by connecting a discharging apparatus to the opening 211. The connecting member 22 forms the accommodation space 221 by being recessed, or the accommodation space 221 is formed by being surrounded by the connecting member 22 and the base 10. The cover plate 30 is formed in an arch-shaped or a bending surface type structure. Specifically, the cover plate 30 may be formed in a structure in which the cross section in the rotation direction is arch-shaped, or in a structure in which the cross section in the rotation direction is a bending surface. In this embodiment, the cover plate 30 is formed with the bending surface type structure. In other embodiments, the cover plate 30 is not limited to this structure and may be formed into the arch-shaped structure. The cover plate 30 has an accommodation state in which the end plate 21 is opened and a shielding state in which the end plate 21 is covered. When the cover plate 30 is in the accommodation state, one end of the cover plate 30 close to the base 10 is disposed facing the accommodation space 221. The cover plate 30 with the arch-shaped or bending surface structure results to a smaller crossing space when being turned over compared to the flat plate structure such that there is not necessary to prepare a large space in the front portion of the charging apparatus or discharging apparatus 100 for turning over the cover plate 30.

In order to form the accommodation space 221, a part of the connecting member 22 may be recessed to form the accommodation space 221 with the evacuation function. Alternatively, after the connecting member 22 and the base 10 are connected, the accommodation space 221 with the evacuation function may be formed by being surrounded by the connecting member 22 and the base 10. The specific method of forming the accommodation space 221 may be determined according to the actual situation. In this embodiment, an example in which the accommodation space 221 is formed by partially recessing the connecting member 22 will be described.

In order to accommodate the cover plate 30, the connecting member 22 is gradually recessed inward along the direction extending toward the base 10 to form the accommodation space 221. The accommodation space 221 has a function of evacuating the cover plate 30, and the formation of the accommodation space 221 does not affect the use of other spaces. The connecting member 22 may be formed by extending the top portion, side portion, or bottom portion of the end plate 21. That is, the accommodation space 221 may be formed at any position such as the top portion, side portion, or bottom portion of the fixing base 20. The specific position of the accommodation space 221 is not limited as long as it satisfies the evacuation function. The recessed shape of the connecting member 22 matches the shape of the cover plate 30. When the cover plate 30 is in the accommodation state, the surface of the cover plate 30 and the connecting member 22 are attached to each other with a higher degree, and the gap therebetween becomes smaller such that dust, rainwater or the like can be effectively prevented from passing through the gap to enter into the charging apparatus or discharging apparatus 100. Even if the dust, rainwater or the like enter the gap, the recessed portion of the connecting member 22 can accommodate the dust, rainwater and the like such that they do not enter the inside of the charging apparatus or discharging apparatus 100 from the connecting member 22. It is possible to prevent the dust, rainwater and the like from damaging the functions of electronic components mounted inside the charging apparatus or discharging apparatus 100. Here, an edge portion of the end plate 21 may be extended to the left and right sides of the outside to form an extension plate 213 to improve the overall strength of the end plate 21.

When the charging apparatus or discharging apparatus 100 is used, the end plate 21 is opened by rotating the cover plate 30 toward the inside of the accommodation space 221. In an example in which the cover plate 30 is rotated vertically, the cover plate 30 is formed in the arch-shaped structure or the bending surface structure, and the space that the cover plate 30 crosses in the front portion of the charging apparatus or discharging apparatus 100 is relatively small such that less space is required to be reserved in the height direction at the front portion thereof. At the same time, when the cover plate 30 is rotated, the rear portion synchronously crosses over such that the accommodation space 221 formed by the recessed portion of the connecting member 22 is configured to realize the evacuation function with respect to the rotation operation of the cover plate 30 and allow the cover plate 30 to rotate smoothly. Therefore, it is possible to prevent any possible damage since the cover plate 30 is placed outside.

In the charging apparatus or discharging apparatus 100 provided in the embodiment of the present disclosure, the base 10 is used to install the fixing base 20. An opening 211 is formed on the end plate 21 of the fixing base 20, and the opening 211 is used to realize the charging or discharging operation. The end plate 21 forms the accommodation space 221 by recessing the connecting member 22 extending toward the base 10, or the end plate 21 forms the accommodation space 221 being surrounded by the connecting member 22 and the base 10. The cover plate 30 can be rotated to face the accommodation space 221 when performing the charging operation or discharging operation. Since the cover plate 30 has an arch-shaped structure or a bending surface structure, when the cover plate 30 rotates, the rotation angle is smaller and the space occupied during rotation is smaller when compared with a flat-plate-shaped cover. At the same time, when the cover plate 30 is in the accommodation state, it does not protrude outward such that the regularity of the accommodation of the cover plate 30 during charging or discharging is effectively improved, thereby improving the aesthetic appearance during charging or discharging. Since the accommodation space 221 is formed by the connecting member 22 or formed by being surrounded by the connecting member 22 and the base 10, the accommodation space 221 has the evacuation effect and effectively improves the space utilization ration such that it is possible to further save space. Such a structure is suitable for the vehicle type whose structure in the front portion of the vehicle body is compact and has a relatively small space.

Figure 4:
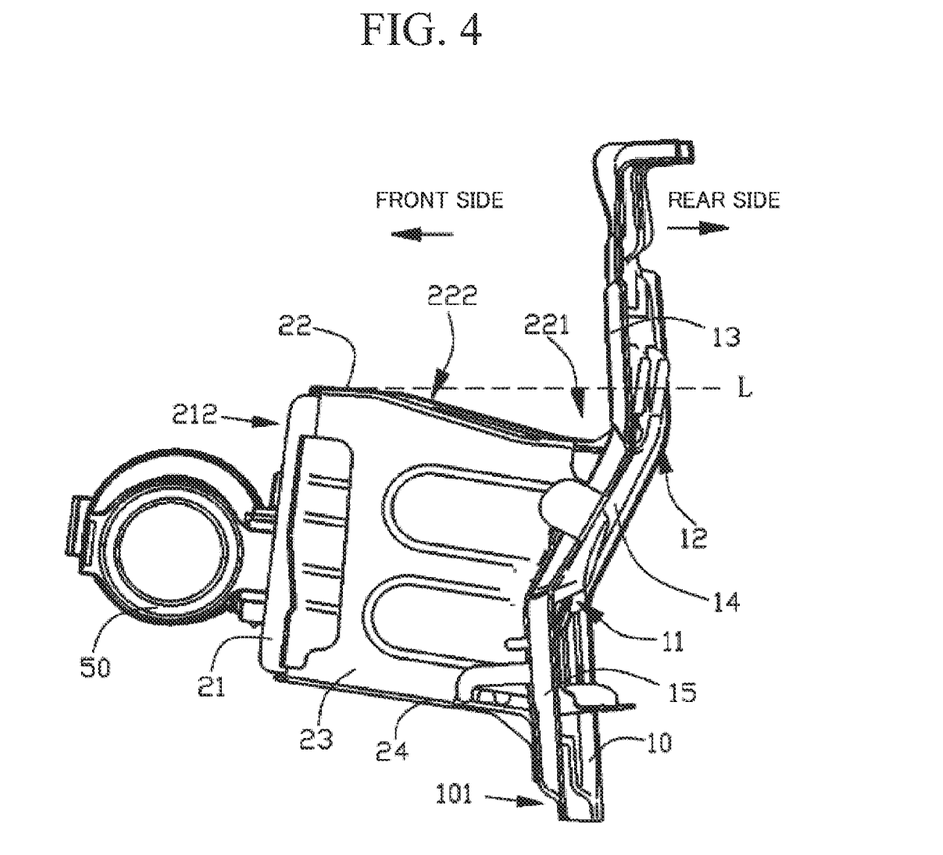
FIG. 4 is a side view showing a side view of the charging apparatus or discharging apparatus provided by the embodiment of the present disclosure.
Figure 5:
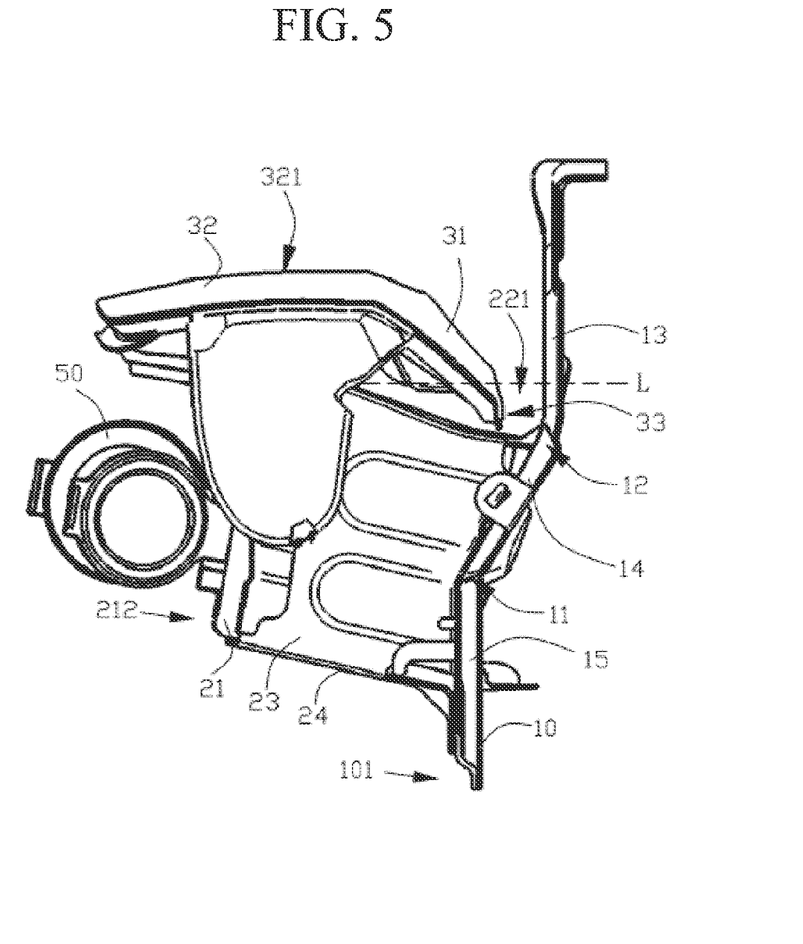
FIG. 5 is a side view showing a state in which a cover plate of the charging apparatus or discharging apparatus provided by the embodiment of the present disclosure is accommodated.
Figure 6:
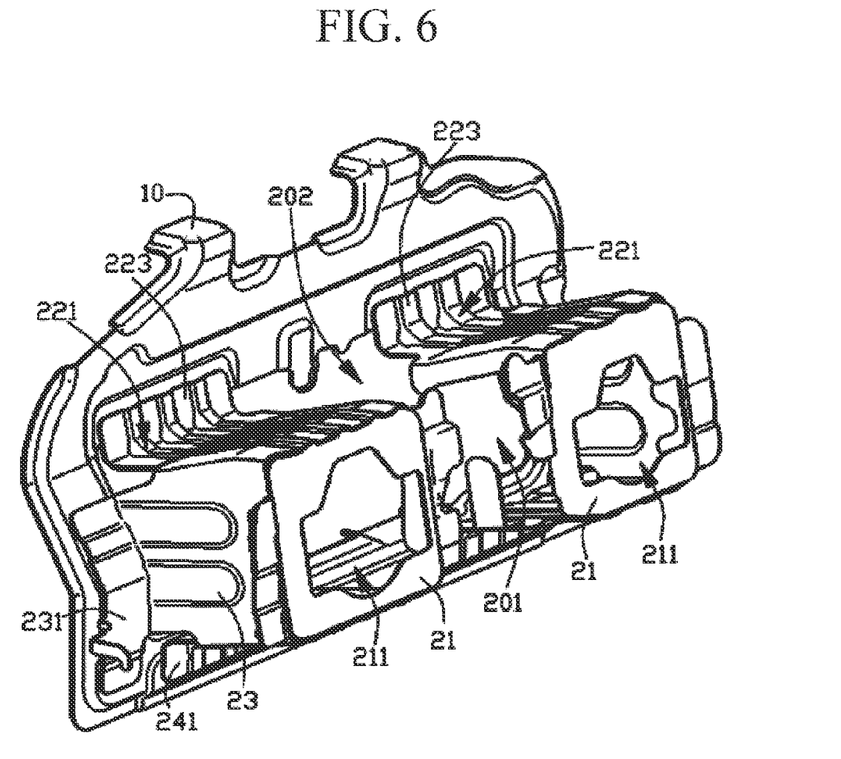
FIG. 6 is a view showing a mounting structure of the base and the fixing base provided by the embodiment of the present disclosure.

As shown in FIG. 4 and FIG. 5, the space formed between the straight line L and the fixing base 20 is the accommodation space 221. When the cover plate 30 is in the accommodation state, one end of the cover plate 30 close to the base 10 (hereinafter referred to as the tip end 33) can be positioned within the accommodation space 221. That is, the tip end 33 may be below the line L (as shown in FIG. 5). Alternatively, the tip end 33 may be directed toward the accommodation space 221. That is, the tip end 33 may be on the same plane with the straight line L, or on the straight line L, and the distal end 33 may approach the straight line L infinitely. As shown in FIG. 5, when the tip end 33 is below the straight line L, the tip end 33 is positioned within the accommodation space 221 and at least a portion of the cover plate 30 is accommodated within the accommodation space 221. For this reason, the space utilization ratio can be effectively improved and the space can be further saved such that it is suitable for the vehicle type whose structure of the front portion of the vehicle body is compact, and has relatively smaller space. In the present embodiment, when the cover plate 30 is in the accommodation state, since the one end (that is, the tip end 33) of the cover plate 30 close to the base 10 is located in the accommodation space 221 and the tip end 33 is below the straight line L, it is possible to reduce the overall volume of the charging apparatus or discharging apparatus 100 in the accommodation state. In other embodiments, the tip end 33 may approach line L infinitely and be directed toward accommodation space 221.

Figure 1:
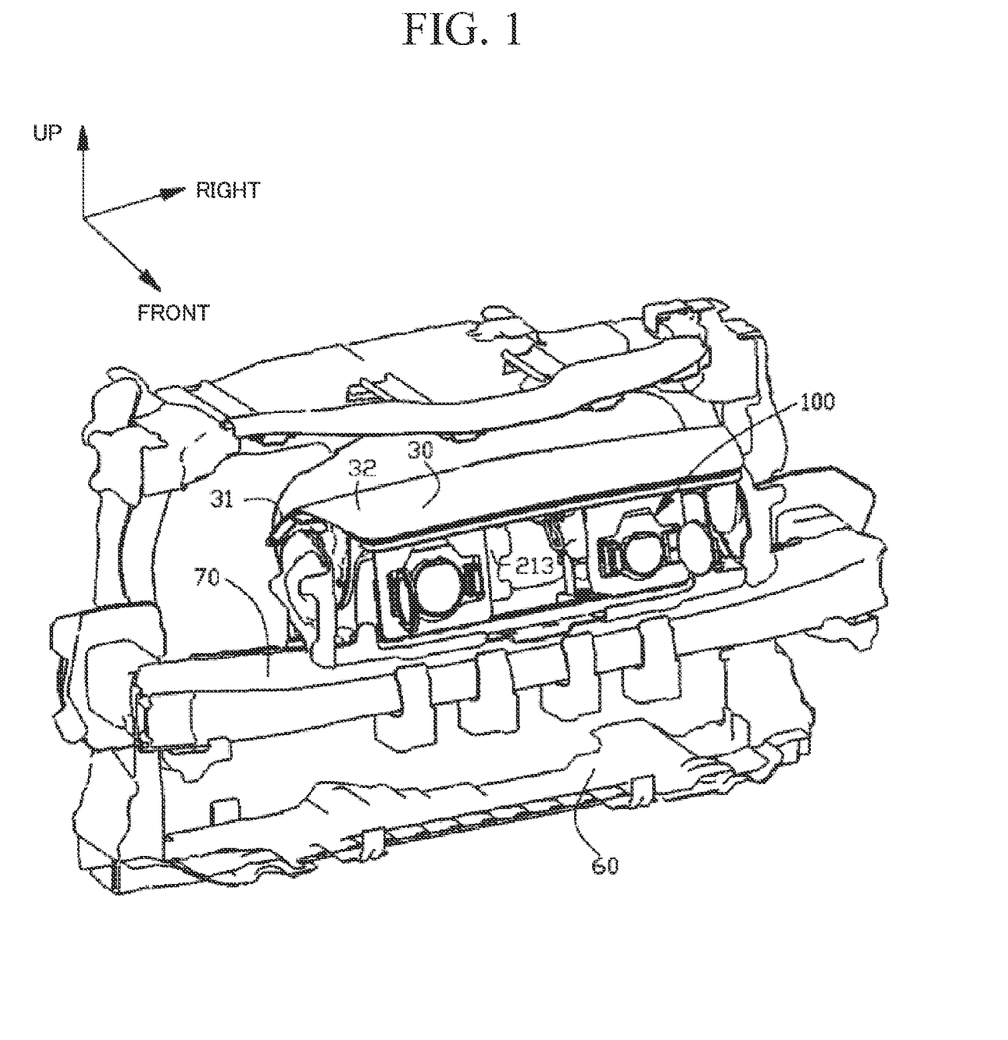
FIG. 1 is a view showing an attachment state of a charging apparatus or discharging apparatus provided by an embodiment of the present disclosure.
Figure 2:
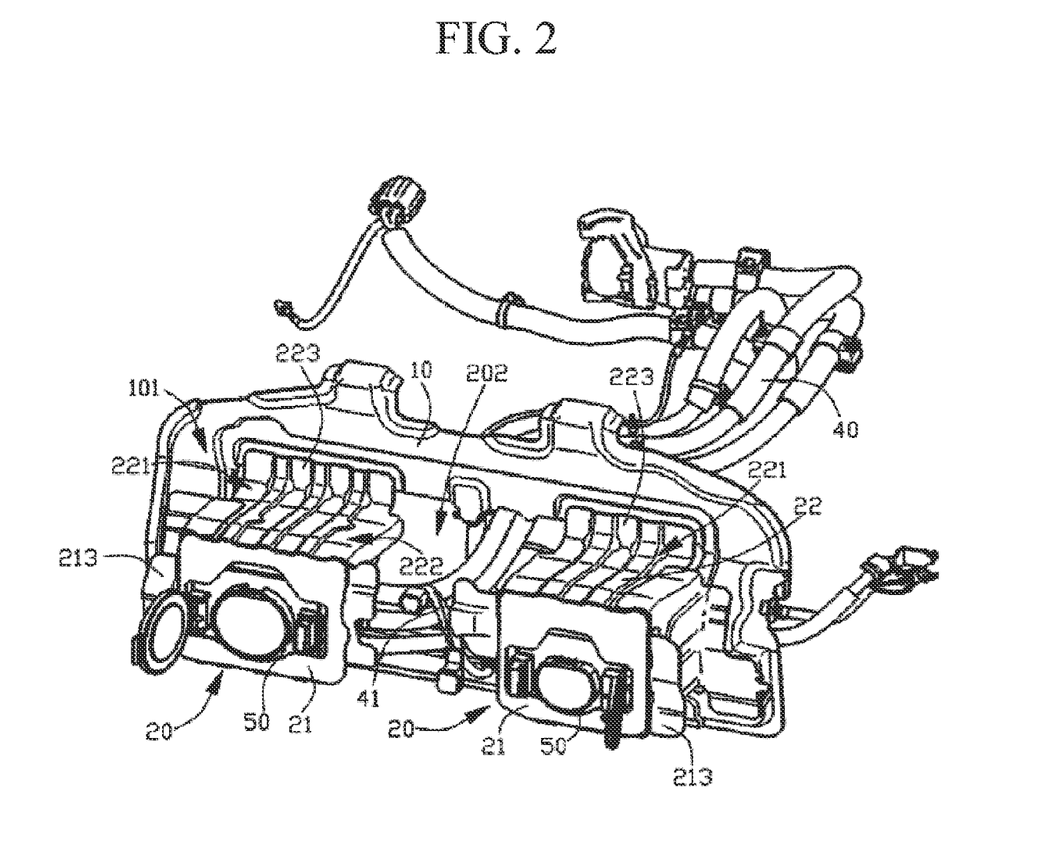
FIG. 2 is a view showing a structure of the charging apparatus or discharging apparatus provided by the embodiment of the present disclosure.
Figure 3:
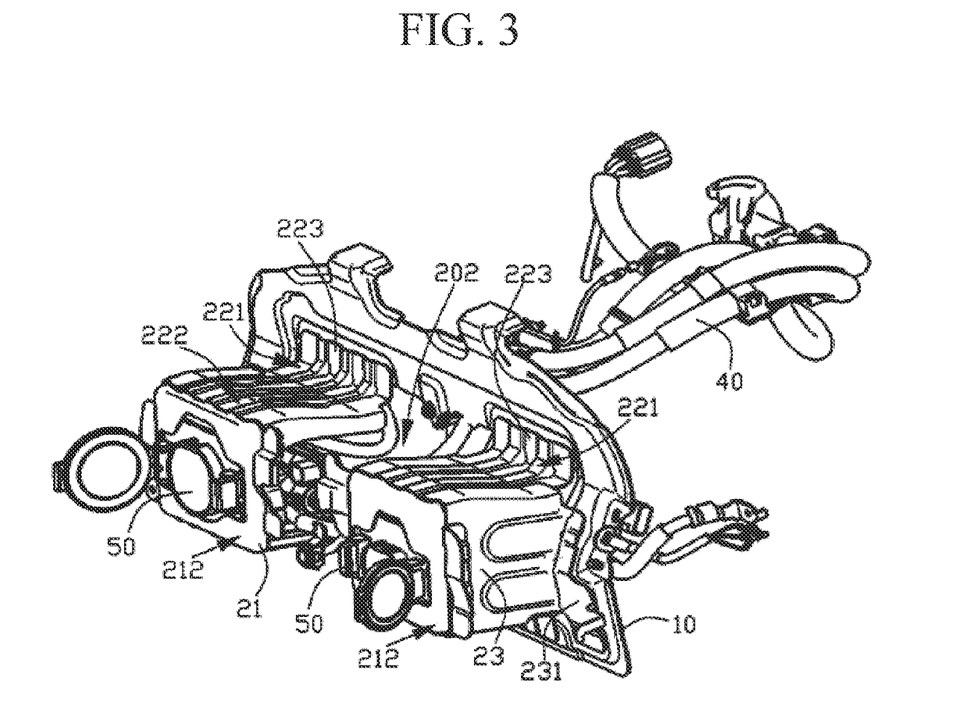
FIG. 3 is a view showing the structure of the charging apparatus or discharging apparatus from another angle provided by the embodiment of the present disclosure.

Referring to FIG. 1 to FIG. 3, in one embodiment, the connecting member 22 has a first surface 222 formed in an arch shape, and the arch shape of first surface 222 conforming to the shape of cover plate 30. When the cover plate 30 is accommodated in the accommodation space 221, the gap between the cover plate 30 and the first surface 222 becomes smaller, such the space utilization ratio becomes higher. Specifically, as shown in FIG. 1 and FIG. 5, the cover plate 30 having the bending surface shape is composed of a first plate member 31 and a second plate member 32 that is inclined with respect to the first plate member 31. A portion of the first plate member 31 is inserted into the recessed portion of the connecting member 22, and at this time, the portion of the cover plate 30 is positioned within the accommodation space 221, and the cover plate 30 is in the accommodation state. The second plate member 32 has a first side surface facing the first surface 222 and a second side surface 321 opposite to the first surface 222 in the accommodation state. When the cover plate 30 is in the accommodation state, the first side is parallel or substantially parallel to the first surface 222, and the gap between the first side and the first surface 222 is relatively small, about 5 mm, such that the cover plate 30 is attached to the fixing base 20, and the space utilization ratio is effectively improved.

Referring to FIG. 1 to FIG. 6, in one embodiment, a number of the openings 211 is at least two. By providing the two openings 211, it is possible to improve the user's comfort. The user can select either of the openings 211 to insert the charging plug and use as necessity. For example, by setting the two openings 211 as a fast charging port and a slow charging port respectively, an appropriate interface can be selected and used during the charging.

Referring to FIG. 1 to FIG. 6, in one embodiment, the number of the fixing bases 20 and the number of the openings 211 are the same. In the present embodiment, the number of the fixing bases 20 is set to two, and the user can use either of the fixing bases 20 as necessity. An evacuation space 202 is formed between each adjacent fixing bases 20. Taking the configuration of the two openings 211 as an example, the two openings 211 are opened on the corresponding end plates 21 of the two fixing bases 20 respectively. Here, the two fixing bases 20 are arranged side by side with a certain distance therebetween and positioned at the same height, such that it is possible to form the evacuation space 202 that is cut out between the two fixing bases 20 on which the two end plates 21 are located. The evacuation space 202 can be used to arrange various components (such as vehicle brand mark, radar, and the like), the charging cable bundle 40, and the like. In addition, the evacuation space 202 is used to perform assembly and wiring for the inside of the fixing base 20. The space utilization ratio inside the charging apparatus or discharging apparatus 100 is high and the degree of structure coherence is improved such that it is suitable for the vehicle type whose structure in the front portion of the vehicle body is compact and has relatively small space.

Referring to FIG. 1 to FIG. 6, in the present embodiment, when the charging apparatus or discharging apparatus 100 is a charging apparatus, the apparatus at least includes two charging cable bundles 40 and at least two charging terminals 50. Each charging terminal 50 is provided in a corresponding opening 211 such that the charging plug can be inserted into the opening 211 for charging. Taking the configuration of providing the two openings 211 as an example, the two openings 211 are correspondingly opened on the end plates 21 of the two fixing bases 20. The number of charging terminals 50 is also two. Here, the two charging terminals 50 can be used as a fast charging terminal and a slow charging terminal, respectively. Each charging cable bundle 40 is electrically connected to the corresponding charging terminal 50 through the evacuation space 202. Here, the number of the charging cable bundles 40 and the number of the charging terminals 50 are the same, and the number of charging cable bundles 40 is two. After the two charging cable bundles 40 are combined into one set, the other end of the charging cable bundle 40 is connected to the power source. Although the combination of the charging cable bundles 40 requires a relatively large space, the evacuation space 202 can provide the necessary space for combining the charging cable bundles 40, thereby making the overall assembly to be easy. In addition, according to the evacuation space 202, the distance between the two charging cable bundles 40 for connecting the two charging terminals 50 can meet the safety insulation distance requirements of the wires. After the two charging cable bundles 40 are connected to the corresponding charging terminals 50 respectively, the two charging cable bundles 40 are summarized into one set of charging cable bundle 40 in the evacuation space 202 by a set of charging cable bundle fixing members 41. Accordingly, the number of charging cable bundle fixing members 41 can be effectively reduced, the cost for fixing the charging cable bundle 40 can be reduced, and the spreading of the charging cable bundle 40 can be prevented from affecting other members. After one end of each of the two charging cable bundles 40 is connected to the corresponding charging terminal 50, the set of charging cable bundles 40 are combined in the intermediate evacuation space 202 between the two fixing bases 20 to form the set of charging cable bundles 40, and the set of charging cable bundles 40 is wired from behind the base 10 and connected to the power source.

In other embodiments, when the charging apparatus or discharging apparatus 100 is a discharging apparatus, the apparatus may have at least two discharging terminals and at least two discharging cable bundles. Each discharging terminal is provided in the corresponding opening 211. One end of each discharging cable bundle is electrically connected to the corresponding discharging terminal through the evacuation space 202, and the other end of each discharging cable bundle is used to connect to the power source. Except for the fact that the functions of the terminals and cable bundles are different, the wiring direction and connection method of the cable bundles are all the same as in the present embodiment, thus the description thereof will be omitted.

Referring to FIG. 1 and FIG. 2, in one embodiment, the end plate 21 is provided at one end of the fixing base 20 away from the base 10. That is, the end plate 21 is arranged apart from the base 10. By arranging the end plate 21 facing outward, the user can easily perform the charging or discharging operation. By inserting the charging plug into the outwardly projecting opening 211 when the user needs to perform the charging operation, and inserting the discharging apparatus into the outwardly projecting opening 211 when the user needs to perform the discharging operation, it is possible to effectively improve the convenience of operation. When the fixing base 20 has a bracket structure, the end plate 21 is provided on one end side away from the base 10 in the bracket structure, that is, the end plate 21 is provided on the side close to the cover plate 30 in the bracket structure. It is easy for the user to insert the charging plug or the discharging apparatus into the opening 211 of the end plate 21 during charging or discharging, which makes the operation simple.

Referring to FIG. 2 to FIG. 6, in one embodiment, endplate 21 has an end surface 212. The end surface 212 can receive the charging plug or the discharging apparatus. The end surface 212 is inclined in the direction of the gravity and at an upward elevation angle. The end surface 212 is inclined from the lower side toward the upper side to approach the base 10 side, that is, the direction of the opening 211 is inclined at the upward elevation angle such that the user can more easily tilt the charging plug or the discharging apparatus downward to insert the charging plug or the discharging apparatus into the opening 211 and the convenience of operation is improved. At the same time, by forming the end surface 212 with the upward inclination, the insertion direction of the charging plug or discharging device is straight to the end surface 212 such that the end surface 212 can effectively disperse the force and weight caused by the insertion of the charging plug or discharging device and improve load-bearing capacity and structural strength. Specifically, the entire fixing base 20 can be installed with an inclination. By installing the fixing base 20 as a whole with the upward elevation angle, the charging terminal 50 and the discharging terminal installed in the fixing base 20 are similarly inclined with the upward elevation angle. By inserting the charging plug or the discharging apparatus into the opening 211, the user can tilt the charging plug or the discharging apparatus into the charging terminal 50 or the discharging terminal to achieve the purpose of charging or discharging.

Referring to FIG. 2 to FIG. 6, in one embodiment, the base 10 has a mounting surface 101 for mounting the end plate 21 thereon. The mounting surface 101 is a bending surface. By supporting the fixing base 20 on the bending surface and by dispersing the force caused by the insertion of the charging plug by the end plate 21, the structural strength and supporting weight of the base 10 can be improved. It should be understood that the fixing base 20 has at least a mounting structure for mounting the end plate 21 on the mounting surface 101. The mounting structure is coupled to the end plate 21 and the mounting surface 101 respectively to achieve the purpose of mounting the end plate 21 to the mounting surface 101. The mounting structure is connected on the mounting surface 101, and the mounting surface 101 is a bending surface. By connecting the mounting structure to different bending portions of the bending surface, the force applied on the bending surface by the mounting structure acts in different directions, and the force applied to the end plate 21 by the bending surface is dispersed. Here, the mounting structure may be a structure such as a reinforcing plate or the like between the end plate 21 and the mounting surface 101. Specifically, the vertical cross-section of the bending surface may have various linear shapes such as a wavy line shape, a polygonal line shape, and an arch shape or the like. In the present embodiment, the vertical cross-section of the bending surface has a polygonal line shape, and the bending surface has two bending portions as a first bending portion 11 and a second bending portion 12. The first bending portion 11 is bent toward the end plate 21 and the second bending portion 12 is bent to be opposite to the end plate 21. The bending direction of the first bending portion 11 and the bending direction of the second bending portion 12 are opposite to each other. At the same time, the mounting surface 101 has an upper portion 13, a middle portion 14 and a lower portion 15 arranged in order from top to bottom. The upper portion 13 and the middle portion 14 are connected at the second bending portion 12, and the middle portion 14 and the lower portion 15 are connected at the first bending portion 11. The upper portion 13 extends upward, the lower portion 15 extends downward, and the middle portion 14 is arranged to be inclined from the bottom to the top in a direction away from the end plate 21. The end plate 21 is placed against the first bending portion 11 and the mounting structure is connected on the middle portion 14 and the lower portion 15 of the mounting surface 101, the first bending portion 11 and the second bending portion 12. According to this configuration, when the force endured by the end plate 21 is transmitted to the base 10 through the mounting structure, both the first bending portion 11 and the second bending portion 12 disperse the force in different directions such that the force from the end plate 21 can be dispersed by the bending surface. The specific structure is referred to FIG. 3 to FIG. 5.

Referring to FIG. 2 to FIG. 6, in other embodiments, the fixing base 20 may have an assistance reinforcing member connected to the base 10 and the end plate 21, respectively. The connecting member 22 is installed on the assistance reinforcing member. By connecting the end plate 21 to the base 10 using the assistance reinforcing member, the end plate 21 can be fixed and mounted thereto. Here, in the present embodiment, there is no assistance reinforcing member being provided between the connecting member 22 and the base 10.

The connecting member 22 may have a plate-shaped structure. The connecting member 22 has one end connected to the end plate 21 and the other end connected to the base 10 to achieve the purpose of attaching the end plate 21 to the base 10. Alternatively, the connecting member 22 may be a reinforcing structure configured by combining reinforcing rods having a plurality of rod-shaped structures. The plurality of reinforcing rods may be placed in parallel, or the plurality of reinforcing rods may be placed across to form the reinforcing structure. One end of each reinforcing rod is connected to the end plate 21, and the other end of each reinforcing rod is connected to the base 10 so as to similarly realize the purpose of attaching the end plate 21 to the base 10. The specific structure of the connecting member 22 can be configured in accordance with the requirement as long as the accommodation space 221 for accommodating the cover plate 30 can be formed by recessing the connecting member 22.

Referring to FIG. 2 to FIG. 6, in one embodiment, the connecting member 22 is disposed on the top portion of end plate 21, with the first surface 222 is arranged to face the top portion. In this embodiment, the connecting member 22 is disposed on the top portion of the end plate 21, that is, the accommodation space 221 is formed on the top portion of the end plate 21. When the charging apparatus or discharging apparatus 100 according to this embodiment is used on a vehicle, the cover plate 30 is turned upward to open the end plate 21. This configuration improves the fashion sense of the vehicle and enhances the comfort at the time of the usage by the user.

Referring to FIG. 2 to FIG. 6, in one embodiment, the fixing base 20 further comprises a first reinforcing member 23. The first reinforcing member 23 is connected to the side portion of the end plate 21 and connected to the base 10. The fixing base 20 further has a second reinforcing member 24 connected to the bottom portion of the end plate 21, and the second reinforcing member 24 is connected to the base 10. By using the first reinforcing member 23 and the second reinforcing member 24 together with the connecting member 22, the end plate 21 is simultaneously reinforced and supported to improve the structural strength of the end plate 21. At the same time, the connecting member 22 is connected to the top portion of the end plate 21, the first reinforcing member 23 is connected to the side portion of the end plate 21, and the second reinforcing member 24 is connected to the bottom portion of the end plate 21, such that the connecting member 22, the first reinforcing member 23, and the second reinforcing member 24 are connected to different positions of the end plate 21 respectively to support the end plate 21. This further improves the structural strength of the end plate 21. It can be understood that the simultaneous use of the connecting member 22, the first reinforcing member 23, and the second reinforcing member 24 in the fixing base 20 described above is to further improve the structural strength of the end plate 21. During actual use, only the connection member 22 may be used to attach the end plate 21 to the base 10 and form the accommodation space 221 to accommodate the cover plate 30. Alternatively, the connecting member 22 and either one of first reinforcing member 23 or second reinforcing member 24 may be used. Alternatively, the connecting member 22, the first reinforcing member 23, the second reinforcing member 24, and more reinforcing members may be used. In this embodiment, as an example, the specific manner of using the connecting member 22, the first reinforcing member 23, and the second reinforcing member 24 is for the purpose of describing a preferred embodiment. In the actual use process, the number of the reinforcing members used is not particularly limited, and can be selected according to actual demand.

Referring to FIG. 2 to FIG. 6, in one embodiment, the connecting member 22, the first reinforcing member 23, and the second reinforcing member 24 all have plate-shaped structures. Here, the specific structures of the connecting member 22, the first reinforcing member 23, and the second reinforcing member 24 may be set to the same structure or different structures. In this embodiment, the connecting member 22, the first reinforcing member 23 and the second 24 are preferably formed in the same plate-shaped structure. If the same type of plate member is mass-produced, the mounting demand can be met so as to make the production to be easier. Compared to the connection structure such as the connecting rod, if all of the connection member 22, the first reinforcing member 23, and the second reinforcing member 24 are set to the plate-shaped structure, the plate-shaped structure can further increase the connection strength. Specifically, ribs may be provided or grooves may be formed on the connecting member 22, and each rib and groove may be arranged to extend in a direction from the end plate side toward the base side. By providing the ribs or forming the grooves on the connecting member 22, the structural strength can be improved. A protrusion projecting outward may be provided on the first reinforcing member 23. In order to improve the structural strength of the first reinforcing member 23, the protrusions may be arch-shaped protrusion structures, ribs, bumps, or the like.

It should be understood that the connecting member 22, the first reinforcing member 23 and the second reinforcing member 24 may be formed in a structure that combines a plurality of connecting rods. By using the connecting rod that is connected to the base 10 and the end plate 21, it is also possible to improve the connection strength. Moreover, the connecting member 22, the first reinforcing member 23, and the second reinforcing member 24 only has to be provided between the base 10 and the end plate 21, the specific structure is not particularly limited, and may be formed in other structures such as a block structure or a columnar structure and the like.

Referring to FIG. 2 to FIG. 6, in one embodiment, the connecting member 22 has a first bending portion 223 for connecting the base 10, the first bending portion 223 faces a surface at one side of the base 10 and is attached to the surface of the base 10, and/or the first reinforcing member 23 has a second bending portion 231 for connecting the base 10, and the second bending portion 231 faces the surface at one side of the base 10 and is attached to the surface of the base 10, and/or the second reinforcing member 24 has a third bending portion 241 for connecting the base 10, and the third bending portion 241 faces the surface at one side of the base 10 and is attached to the surface of the base 10. By attaching the first bending portion 223 to the surface of the base 10, the connecting member 22 and the base 10 are attached and connected, and the connection strength between the connecting member 22 and the base 10 is effectively improved. By attaching the second bending portion 231 to the surface of the base 10, the first reinforcing member 23 and the base 10 are attached and connected, and the connection strength between the first reinforcing member 23 and the base 10 is effectively improved. By attaching the third bending portion 241 to the surface of the base 10, the second reinforcing member 24 and the base 10 are attached and connected, and the connection strength between the second reinforcing member 24 and the base 10 is effectively improved. The connecting member 22, the first reinforcing member 23, and the second reinforcing member 24 can each independently provide the bending portion. In the present embodiment, by forming the first bending portion 223, the second bending portion 231, and the third bending portion 241 in the connecting member 22, the first reinforcing member 23, and the second reinforcing member 24, respectively, the connection strength between the base 10 with the connecting member 22, the first reinforcing member 23, and the second reinforcing member 24 respectively can be improved.

In one embodiment, the charging apparatus or discharging apparatus 100 further comprises a locking device. The locking device is provided for connecting to the cover plate 30 and for locking and rotating the cover plate 30. By locking the cover plate 30 using the locking device, the charging operation can be conveniently performed. Here, the locking mechanism may be either a mechanical locking mechanism or an electromagnetic locking mechanism, and the locking mechanism locks the vehicle automatically when the vehicle is locked and when the vehicle is driven.

Referring to FIG. 1 to FIG. 5, a second embodiment of the present disclosure provides a vehicle. The vehicle has a vehicle body and the charging apparatus or discharging apparatus 100, and the base 10 of the charging apparatus or discharging apparatus 100 is provided in the vehicle body.

The vehicle according to the present disclosure may be a hybrid vehicle or an electric vehicle and has charging and/or discharging functions. By providing the above-described charging apparatus or discharging apparatus 100 in the vehicle body, it is possible to effectively improve the overall regularity and aesthetics during charging of the vehicle. Since the charging apparatus or discharging apparatus 100 requires less space, the configuration may be applied in the vehicle type whose structure of the front portion of the vehicle body is compact, and has a relatively small space. Here, the base 10 may be attached to other positions such as the front portion, the side body portion, and the tail portion of the vehicle body, and the specific attachment position of the base 10 is not particularly limited.

Referring to FIG. 1, in one embodiment, the vehicle body has a front cross member 60 and a front bumper 70 mounted on the front cross member. An upper portion of the base 10 on the side away from the fixing base 20 is connected to the front side of the front cross member 60, and a lower portion of the base 10 on the side separated from the fixing base 20 is connected to the front bumper 70. The base 10 is connected to each of the front cross member 60 and front bumper 70, respectively, and has a plurality of connection points for the front cross member 60 and the front bumper 70 such that the connection strength of base 10 is secured. At the same time, by attaching the base 10 to the front cross member 60 and the front bumper 70, the end plate 21 of the fixing base 20 faces the front part of the vehicle body, and the cover plate 30 rotates at the front part of the vehicle body so as to open the fixing base 20 or shield the fixing base 20.

Referring to FIG. 1 to FIG. 6, when the charging apparatus or discharging apparatus 100 is specifically a charging apparatus, and applied on a vehicle, the rear side of the base 10 is attached to the front cross member 60 and the front bumper 70 of the vehicle body so as to secure the connection strength of the base 10. Two fixing bases 20 are provided in parallel on the front side of the base 10. The fixing bases 20 include an end plate 21 having an opening 211, a connecting member 22 connected to the outer edge of the end plate 21, a first reinforcing member 23 and a second reinforcing member 24. The connecting member 22, the first reinforcing member 23, and the second reinforcing member 24 all adopt a plate-shaped structure. The connecting member 22, the first reinforcing member 23 and the second reinforcing member 24 are all connected to the base 10. A first bending portion 223, a second bending portion 231, and a third bending portion 241 are provided in the connecting member 22, the first reinforcing member 23, and the second reinforcing member 24 respectively, and the connecting member 22, the first reinforcing member 23, and the second reinforcing member 24 are attached to the surface of the base 10 via the first bending portion 223, the second bending portion 231 and the third bending portion 241. The connecting member 22, the first reinforcing member 23, and the second reinforcing member 24 are attached and connected to the base 10 such that the connection strength between the base 10 and the connecting member 22, the first reinforcing member 23, and the second reinforcing member 24 can be effectively improved. Here, the connecting member 22 is connected to the top portion of the end plate 21, and the connecting member 22 is recessed to form the accommodation space 221. The cover plate 30 is formed to have a bending surface structure, and the recessed shape of the connecting member 22 matches the shape of the cover plate 30. When the tip end 33 of the cover plate 30 rotates into the accommodation space 221, the degree of the surface attachment between the cover plate 30 and the connecting member 22 becomes higher and the gap therebetween becomes smaller. An evacuation space 202 is formed between the two end plates 21 by cutting out a part thereof. Two charging terminals 50 are inserted into corresponding openings 211 as a fast charging terminal and a slow charging terminal respectively. By connecting the two charging cable bundles 40 to the corresponding charging terminals 50 and summarizing the two charging cable bundles 40 in the evacuation space 202, the two charging cable bundles 40 are connected to the corresponding charging terminals 50 and converged into the evacuation space 202 through the evacuation port 201. Also, the two charging cable bundles 40 are arranged into a set of charging cable bundles 40 in the evacuation space 202 by using one charging cable bundle fixing member 41. As a result, the use of the charging cable bundle fixing member 41 can be effectively reduced, the cost for fixing can be reduced, and the charging cable bundle 40 can be prevented from diverging and interfering with other members. At the same time, this set of charging cable bundles 40 is routed along the direction away from the base 10 and connected to the power source. Specifically, by tilting the entire fixing base 20, the end surface 212 is inclined in the direction of gravity and inclined upward at an elevation angle. That is, the direction of the opening 211 is set to be inclined at the upward elevation angle. The user can more easily tilt the charging plug downward and insert it into the opening 211, thereby improving the convenience of operation. At the same time, the end surface 212 is provided with an upward inclination, and the insertion direction of the charging plug is straight on the end surface 212, such that the end surface 212 can disperse the force and weight caused by the insertion of the charging plug, thereby improving the load-bearing capacity and the structural strength. By forming the mounting surface 101 of the base 10 into a bending surface and supporting the fixing base 20 by the bending surface, the end plate 21 can disperse the action of the force due to the insertion of the charging plug, and the structural strength and supporting weight of the base 10 can be improved.

While several embodiments of the invention have been described, these embodiments have been presented by way of example and are not intended to limit the scope of the invention. These embodiments can be implemented in various other forms, and various omissions, replacements, and modifications can be made without departing from the scope of the invention. These embodiments and their modifications are included in the scope and spirit of the disclosure, as well as the scope of the invention described in the claims and equivalents thereof.

What is claimed is:

1. A charging apparatus or discharging apparatus, comprising:
   a base;
   a fixing base that is fixed and provided on the base; and
   a cover plate,
   wherein the fixing base comprises:
      an end plate;
      a connection member that is formed by extending from the end plate to the base and connected with the base;
      an opening that is provided on the end plate and configured to perform charging and discharging; and
      an accommodation space that is formed by the connection member being recessed or formed by being surrounded by the connection member and the base,
   the cover plate is formed in an arch-shaped structure or a bending surface structure and includes an accommodation state in which the end plate is exposed and a covering state in which the end plate is covered,
   when the cover plate is in the accommodation state, an end of the cover plate which is close to the base is provided to be directed to the accommodation space, and
   the connection member includes a first surface having an arch shape, and the arch shape of the first surface matches with a shape of the cover plate.

2. The charging apparatus or discharging apparatus according to claim 1, wherein when the cover plate is in the accommodation state, the end of the covering state which is close to the base is positioned in the accommodation space.

3. The charging apparatus or discharging apparatus according to claim 1, wherein the end plate is provided at an end separating from the base in the fixing base.

4. The charging apparatus or discharging apparatus according to claim 1, wherein the end plate includes an end surface for charging or discharging, and the end surface is inclined to the base side from a lower side toward an upper side.

5. The charging apparatus or discharging apparatus according to claim 4, wherein the base includes a mounting surface for mounting the end plate, and the mounting surface is formed as a bending surface.

6. The charging apparatus or discharging apparatus according to claim 5, wherein the mounting surface includes:
   an upper portion formed to extend toward the upper side;
   a middle portion provided to be inclined and including an upper end connected to a bottom side of the upper portion; and
   a lower portion formed to extend toward the lower side and including an upper end connected to a bottom side of the middle portion.

7. The charging apparatus or discharging apparatus according to claim 1, wherein the connection member is provided in a top portion of the end plate, and the first surface is formed toward the top portion.

8. The charging apparatus or discharging apparatus according to claim 7, wherein the fixing base further includes a first reinforcing member that is connected with the base and a side portion of the end plate.

9. The charging apparatus or discharging apparatus according to claim 7, wherein the fixing base further includes a second reinforcing member that is connected with the base and a bottom portion of the end plate.

10. The charging apparatus or discharging apparatus according to claim 9, wherein the first reinforcing member and the second reinforcing member have a plate-shaped structure.

11. The charging apparatus or discharging apparatus according to claim 10,
   wherein the connection member includes a first bending portion for connecting the base, the first bending portion being toward a surface on one side of the base and attaching to the surface of the base, and/or
   the first reinforcing member includes a second bending portion for connecting the base, the second bending portion being toward a surface on one side of the base and attaching to the surface of the base, and/or
   the second reinforcing member includes a third bending portion for connecting the base, the third bending portion being toward a surface on one side of the base and attaching to the surface of the base.

12. The charging apparatus or discharging apparatus according to claim 1, further comprising a locking device connected with the cover plate and configured to lock and rotate the cover plate.

13. A vehicle, comprising:
a vehicle body; and
the charging apparatus or discharging apparatus according to claim 1,
wherein the base of the charging apparatus or discharging apparatus is provided in the vehicle body.

14. The vehicle according to claim 13,
wherein the vehicle body includes a front cross member and a front bumper, and
in the base, an upper portion at a side being away from the fixing base is connected with a front side of the front cross member, and a lower portion at the side being away from the fixing base is connected with a front side of the front bumper.

15. A charging apparatus or discharging apparatus, comprising:
a base;
a fixing base that is fixed and provided on the base; and
a cover plate,
wherein the fixing base comprises:
an end plate;
a connection member that is formed by extending from the end plate to the base and connected with the base;
an opening that is provided on the end plate and configured to perform charging and discharging; and
an accommodation space that is formed by the connection member being recessed or formed by being surrounded by the connection member and the base,
the cover plate is formed in an arch-shaped structure or a bending surface structure and includes an accommodation state in which the end plate is exposed and a covering state in which the end plate is covered,
when the cover plate is in the accommodation state, an end of the covering state which is close to the base is provided to be directed to the accommodation space,
a pair of openings including the opening,
a number of fixing bases, including the fixing base, is equal to the number of the openings,
an evacuation space is formed between adjacent ones of the fixing bases, and
the charging apparatus or discharging apparatus further comprises:
at least two charging terminals provided in the corresponding openings; and
at least two charging cable bundles which has one end passing through the evacuation space to electrically connect with the corresponding charging terminal and another end connecting with a power source, or
the charging apparatus or discharging apparatus further comprises:
at least two discharging terminals provided in corresponding ones of the openings; and
at least two discharging cable bundles which has one end passing through the evacuation space to electrically connect with the corresponding discharging terminal and another end connecting with the power source.

* * * * *